July 31, 1934.　　　　J. T. SMITH　　　　1,968,507
REFRIGERATING SYSTEM FOR ICE CREAM FREEZERS
Filed Feb. 29, 1932　　　3 Sheets-Sheet 3
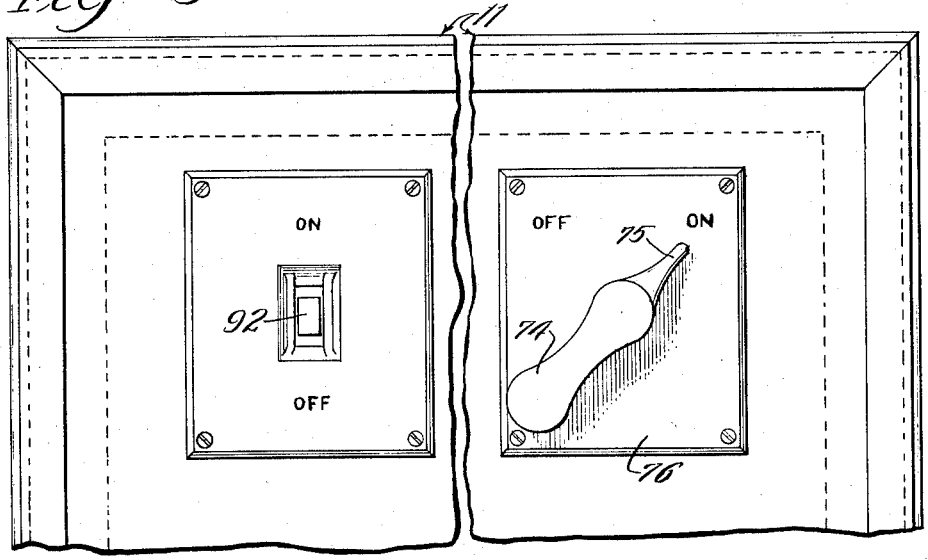
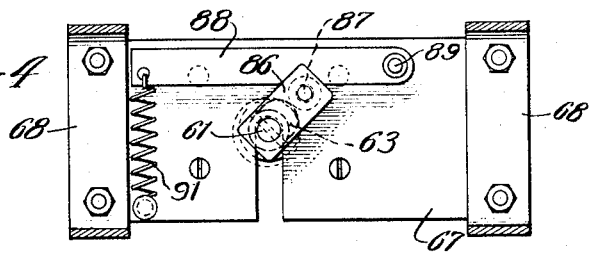
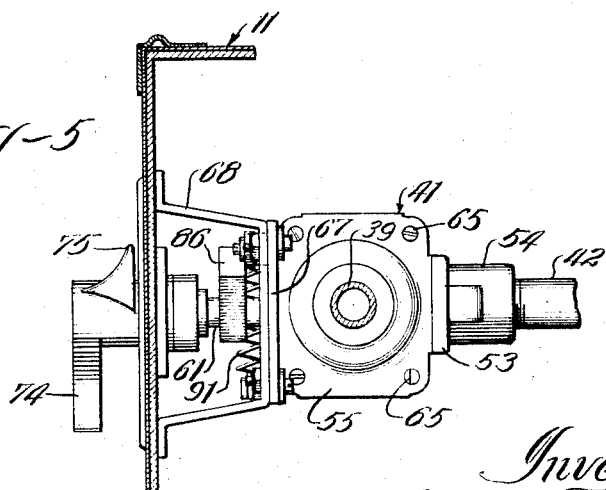
Inventor,
James T. Smith.
By:- Carl S. Lloyd
Att'y.

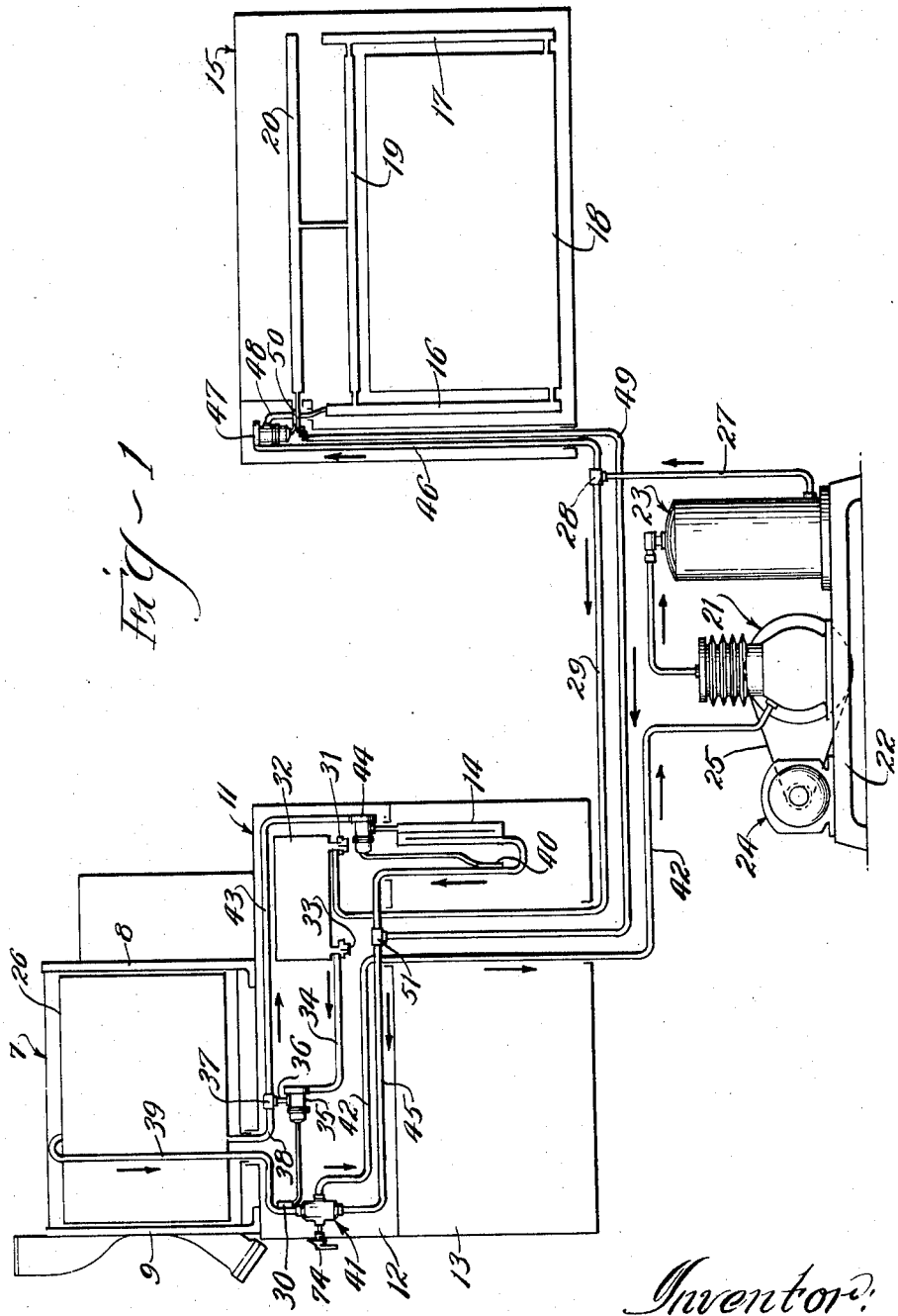

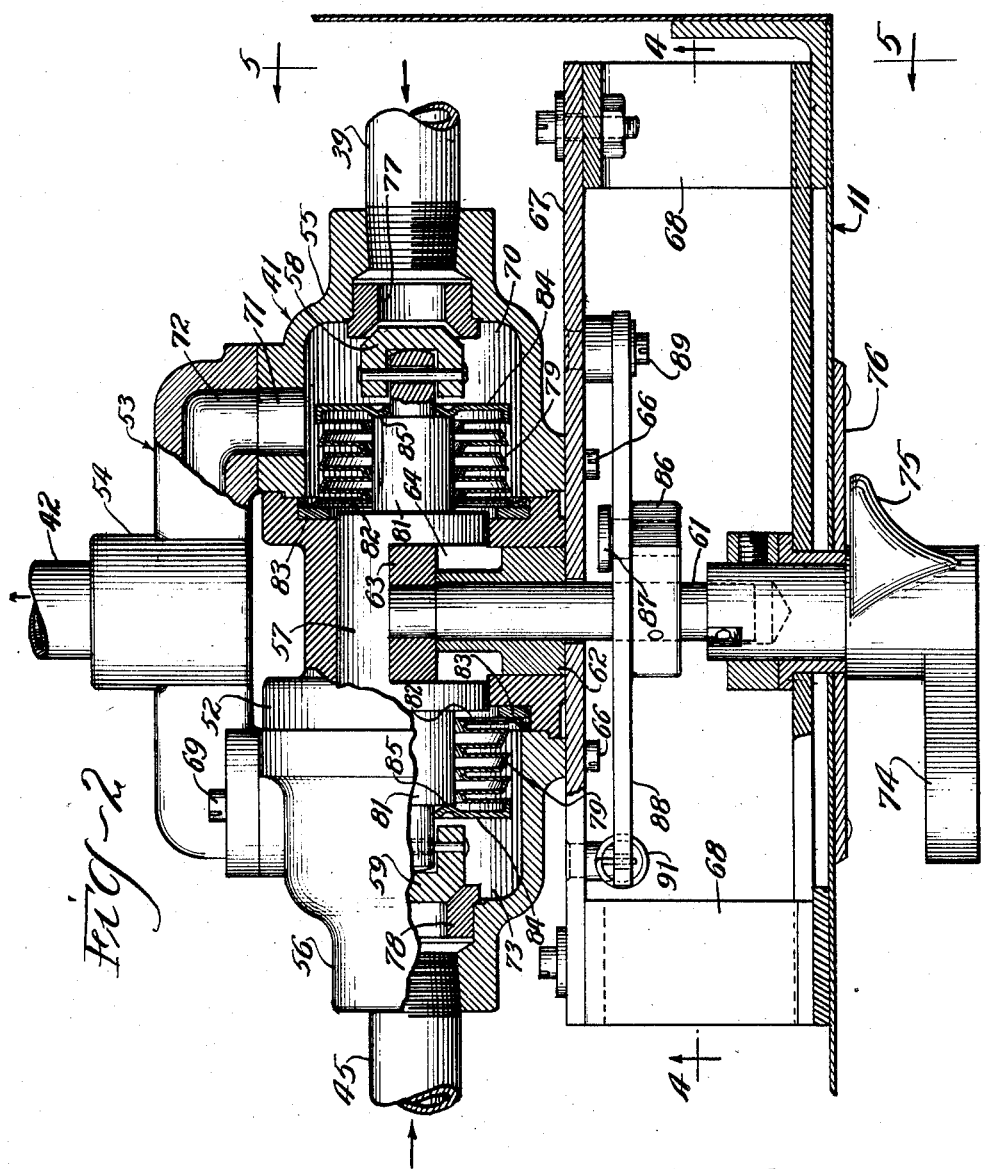

Patented July 31, 1934

1,968,507

UNITED STATES PATENT OFFICE 1,968,507

REFRIGERATING SYSTEM FOR ICE CREAM FREEZERS

James T. Smith, Chicago, Ill., assignor to Mills Novelty Company, Chicago, Ill., a corporation of Illinois Application February 29, 1932, Serial No. 595,685

6 Claims. (Cl. 62—115)

This invention relates to a refrigerating system for ice cream freezers and particularly to a system which is designed to operate, in conjunction with the freezer, one or more auxiliary refrigerating units such as mix cooling cabinets, hardening cabinets, and the like.

At the present time it is becoming the common practice for sellers of ice cream too equip their establishments with apparatus for making and storing the cream in amounts sufficient to meet their immediate sales requirements. The freezing equipment which is used for this class of trade ordinarily includes, in addition to the freezer itself, one or more auxiliary cooling or refrigerating units such as mix cooling cabinets, hardening cabinets, and the like, which are used to keep the supply of cream mix in cool condition preparatory to freezing and also for maintaining the frozen cream in hardened condition during the time in which it is being held for sale.

For the average freezer and refrigerator installation of the type referred to, the capacity of the freezer is such that it need be operated only periodically in order to maintain a sufficient supply of frozen cream on hand. However, while the freezer is operating the load on the system is abnormally high, and a condenser which may be of ample capacity for the normal demands of the system, with the freezer idle, would not be large enough to meet the refrigeration requirements during the interval of freezing.

The object of my invention is to provide a refrigerating system of the type referred to in which all units of the system, except the freezer, may be isolated from the condenser during the period of freezing, thereby rendering the entire capacity of the condenser available for the freezer during the freezing operation.

The invention will be fully understood from the following detailed description, taken in connection with the accompanying drawings, in which I have shown a preferred embodiment thereof.

Referring to the drawings:

Fig. 1 is a diagrammatic view of a refrigerating system embodying a freezer, and auxiliary refrigerating units arranged for operation from a single condensing unit;

Fig. 2 is a detail view of the valve mechanism which is used in the system for transferring the condenser from the freezer to the refrigerating units, portions of the valve housing being broken away to show the internal structure;

Fig. 3 is a broken elevational view of a portion of the front panel of the mix cabinet showing the control handle for the valve mechanism;

Fig. 4 is a section through the valve mechanism taken on line 4—4 of Fig. 2; and Fig. 5 is a view of the valve mechanism taken on line 5—5 of Fig. 2.

Briefly the invention consists in providing in the vapor return lines for the freezer, and the refrigerating unit, a, valve mechanism which operates to close one of the return lines and open the other, thereby rendering the condenser available for one unit or the other, depending upon the setting of the valve. If several refrigerating units are used in the system, in conjunction with the freezer, the several units are connected to a common vapor return, so that a simple two-way valve may be employed to throw the condenser into communication with either the freezer or the refrigerating unit or units.

Referring to the general view of the system shown in Fig. 1, the numeral 7 indicates a freezer of the horizontal type, which is supported at its opposite ends upon uprights 8 and 9, the latter being in turn supported on a cabinet 11 which is partitioned off to provide in the upper portion thereof a compartment 12 in which are contained the agitator drive motor and various parts of the refrigeration mechanism. The lower portion of said cabinet provides a compartment 13 in which the cream mix is maintained in cool condition preparatory to freezing. A cooling coil 14, which is connected in the refrigerating system in a manner presently to be explained, serves to maintain this compartment at an average temperature of about 35° to 40° F.

Continuing the reference to Fig. 1, the system includes a hardening cabinet 15 which is provided along its opposite end walls with cooling slabs 16 and 17, and along its side walls with similar cooling slabs 18. In the embodiment shown, the lower portion of the cabinet 15 is arranged to receive cans of bulk ice cream, and the upper portion of the cabinet is designed for hardening package goods. The cooling slabs for the package compartments are indicated at 19 and 20. The cooling slabs 16—20 are filled with suitable anti-freeze solution and are provided with coils of copper tubing through which the refrigerant circulates. As will presently appear, the coils of the several slabs are connected in the refrigerating circuit in series with one another.

As the mix is drawn from the freezer it is in a semi-fluid condition, being at a temperature of about 25° F., and the purpose of the hardening cabinet is to reduce the mix from the semi-frozen condition to fully hardened condition, which is attained at a temperature of between zero and 5° F., this being the average temperature which is preferably maintained in the hardening cabinet.

The compressor-condenser unit which circulates the refrigerant through the system is shown in the lower central portion of Fig. 1 and comprises: a compressor 21, positioned upon a base 22; a condenser 23, positioned on base 22, adjacent the compressor 21; and an electric motor 24 having a belt drive connection 25 with the compressor 21. Further details of construction of this portion of the apparatus will not be given, since it is well understood in the art and forms no part of the present invention.

The freezer 7 is of the direct expansion type, the freezer cylinder (not shown) being surrounded by a jacket 26 which is positioned in spaced relation to the freezer cylinder to form with the latter a compartment for receiving a refrigerating medium such as methyl chloride, or the like. The supply line which conducts liquid refrigerant from condenser 23 to the cooling compartment of the freezer, includes a conduit 27 which leads from the bottom of the condenser to a T-connection 28, the latter in turn connecting with a conduit 29 which connects through an inlet shut-off valve 31 with a refrigerant storage tank 32. Liquid refrigerant from tank 32 passes through an outlet shut-off valve 33 to a conduit 34 which leads to a thermostatic expansion valve 35. From valve 35, the refrigerant passes through a pipe 36 and a T-connection 37 to a conduit 38 which conducts liquid refrigerant to an inlet opening in the lower portion of the cooling compartment of the freezer.

The pressure on the liquid refrigerant is reduced somewhat in expansion valve 35, and as it reaches the cooling compartment of the freezer, it vaporizes rapidly due to absorption of heat from the warm mix contained in the cream chamber. The vaporized refrigerant is removed from the top of jacket 26 through a take-off conduit 39 which connects through a two-way valve 41 with a suction line 42 which returns the vaporized refrigerant to compressor 21. The use of the two-way valve 41 in the vapor return line for the freezer constitutes a very vital feature of the invention. However, the details of construction of a valve which may be suitable for use in this connection will not be given until the general relation of the valve to the complete system has been fully described.

The supply of liquid refrigerant to the cooling coil 14 of the mix compartment is taken from the liquid supply line for the freezer through T-connection 37 and a conduit 43 to a thermostatic expansion valve 44, the latter connecting with cooling coil 14. The vapor return for coil 14 is through a pipe 45 to one side of the two-way valve 41, the return from valve 41 to the compressor being through conduit 42 which also, as previously noted, connects through valve 41 with the vapor return 39 for the freezer.

The supply of liquid refrigerant to hardening cabinet 15 is taken from condenser 23 through pipe 27 and T-connection 28 to a conduit 46 which connects with a thermostatic expansion valve 47, the latter being positioned in the hardening cabinet. From valve 47 the refrigerant is conducted through a pipe 48 to the cooling coil in the first of the cooling slabs 16. The coils of the slabs 16—20 are connected in series, the refrigerant, after passing through the several coils in said slabs, being returned through a conduit 49 to the vapor return conduit 45 for the mix cooling cabinet, conduits 45 and 49 being connected together by a T-fitting 51.

The thermostatic expansion valves 35, 44, and 47 have their respective power elements 30, 40 and 50 positioned adjacent the vapor return lines for the respective units served by the valves, thereby insuring automatic control of the supply of refrigerant to the several units in accordance with the rise and fall in the temperature of the vapor being conducted from the units. The compressor-condenser unit of the system is provided with a pressure control device (not shown) which automatically cuts out the unit when the pressure falls to a certain value, and cuts it in when the pressure rises to a predetermined value.

The direction of flow of refrigerant in the system is indicated by the arrows in Fig. 1, and from the foregoing description it will be clear that the compressor-condenser unit 21, 23 is arranged to serve either the freezer or the mix and hardening cabinets, depending upon the setting of valve 41 which, as will presently appear, is so constructed that in one position it will effect direct connection between lines 39 and 42 to establish a vapor return from the freezer to the compressor, while in the other position it will effect direct connection between lines 45 and 42 to complete the vapor return from the mix and hardening cabinets to the compressor. Separate operation of either the freezer or the mix and hardening cabinets from the same compressor-condenser unit is thus provided for. The full capacity of the condenser is thus made available for the abnormally heavy demand which is made on the system during the period of freezing. When a batch of mix has been frozen to the desired degree, valve 41 may be turned to prevent flow of refrigerant from the freezer and at the same time automatically re-connects the condenser to the circuit including the mix and hardening cabinets to supply the normal cooling demands of these units. At no time is it necessary for the condenser to meet the combined refrigeration requirements of both the freezer and the mix and hardening cabinets. The invention thus makes it possible to adequately serve both the freezer and the mix and hardening cabinets with a condenser having only such capacity as would be necessary for the freezer alone.

In Figs. 2–5 are shown the details of construction of the two-way valve 41. The valve comprises: a hollow frame piece 52; a back plate 53 having a rearwardly projecting tubular portion 54 which connects with conduit 42; a pair of bell-shaped members 55 and 56, disposed on the opposite sides of frame piece 52 and provided at their outer ends with tapped openings for receiving conduits 39 and 45, respectively; a reciprocating plunger 57 extending transversely through frame piece 52 and provided at its opposite ends with valves 58 and 59 for closing vapor lines 39 and 45, respectively; and a cam shaft 61 journaled for free rotation in a bearing 62 carried by frame piece 52, said shaft being provided at its inner end with a cam 63 which is received in a squared opening 64 formed in plunger 57.

Members 55 and 56 are clamped against the opposite faces of frame piece 52 by bolts 65 (Fig. 5), and are also secured by bolts 66 to a mounting plate 67, the latter being supported from the walls of the cabinet 11 by brackets 68. Plate 53 is held in place by bolts 69 which engage members 55 and 56. Refrigerant passes from conduit 39 into a chamber 70 formed in member 55, and exits from said chamber through an opening 71 which registers with a passage 72 formed in plate 53, said passage in turn communicating with conduit 42 through member 54. In a similar manner conduit 45 communicates with conduit 42 through a chamber 73 formed in member 56, said chamber having connection through plate 53 with conduit 42. Separate paths of connection between conduits 39 and 42 and conduits 45 and 42 are thus provided, the flow of vapor being through either pipes 39 or 45, depending upon the position of plunger 57 and valves 58 and 59.

Valves 58 and 59, which are carried on the opposite ends of plunger 57, are moved to effect alternate opening and closing of conduits 39 and 45, respectively, by turning cam shaft 61, a hand piece 74 secured to the forward end of said shaft being provided to effect turning of the latter. Hand piece 74 is provided with a pointer 75 which indicates the "on" and "off" positions of the valve, as clearly shown in Fig. 3, a plate 76 provided with "on" and "off" markings being mounted on the wall of cabinet 11 adjacent said pointer. In the "on" position of the valve, which is the position shown in Fig. 2, line 39, which is the vapor return for the freezer, is opened and communicates directly with conduit 42. When the valve is turned to the "off" position, plunger 57 is moved to the right, viewing Fig. 2, thereby seating valve 58 on its associated valve seat 77 removing valve 59 from its associated valve seat 78, this operation resulting in the closing of vapor return line 39 for the freezer and the opening of vapor return line 45 for the mix and hardening cabinets.

Valve chambers 70 and 73 are sealed to avoid leakage of refrigerant by means of copper bellows 79 which are carried on stem portions 81 of plunger 57. The inner ends of the bellows 79 are provided with annular end plates 82 which are clamped between gaskets 83 and the inner edges of members 55 and 56. The outer ends of bellows 79 are provided with end plates 84 which bear on shoulders 85 formed on the stem portions 81 of the plunger. The use of the bellows 79 eliminates the need of providing a stuffing box for each valve chamber and affords an efficient seal against leakage of refrigerant.

Plunger 57 is retained in either the "on" or the "off" position by a spring latch mechanism shown in Figs. 2 and 4. An arm 86, carried by shaft 61, is provided with a pin 87 which is yieldingly engaged by a bar 88, the latter being pivoted at 89 to plate 67. Bar 88 is held in yielding engagement with pin 87 by a coil spring 91 which extends between the free end of said bar and a fixed point on plate 67. It will be apparent that when the valve is in the "on" position the action of bar 88 on pin 87 will tend to turn shaft 61 in a clockwise direction, viewing Fig. 4, to maintain the valve in "on" position, and in a similar manner, when the valve is turned to "off" position, bar 88 tends to turn shaft 61 in a counter-clockwise direction, viewing Fig. 4 to hold the valve in the "off" position.

The operation of the system is briefly as follows:

Assuming valve 41 to be in the "off" position, in which position vapor return line 45 for the mix and hardening cabinets is connected through line 42 to the compressor, the entire capacity of condenser 23 is on said mix and hardening cabinets with the freezer completely isolated from the system. When it is desired to place the freezer in operation, valve 41 is thrown to the "on" position, thereby isolating the mix and hardening cabinets from condenser 23 by closing line 45, and connecting vapor return line 39 for the freezer directly to suction line 42. The agitator motor of the freezer is then placed in operation by throwing a switch 92 (Fig. 3) to the "on" position. The rapid transfer of heat from the comparatively warm mix in the freeer temporarily cause a rise of perssure. This condition, however, is soon overcome, the pressure being reduced back to normal as the heat of the mix is absorbed by the evaporation of refrigerant in the freezer cooling chamber. This heavy exchange of heat at the start of the freeing operation temporarily overloads the condensing unit, and this is one reason why it is desirable to have the entire capacity of the condenser available for the freezer. As soon as the mix has been reduced to a temperature of about 25° F., at which temperature it assumes a semi-fluid condition, the vapor return from the freezer is cut off by throwing valve 41 to the "on" position, which automatically disconnects line 39 from line 42 and re-connects line 45 to line 42, thereby returning the condenser to the mix and hardening cabinets. After the semi-frozen mix in the freezer has been subjected to the usual whipping operation, following the cut-off of the supply of refrigerant to the freezer, it is drawn from the freezer and placed in the hardening cabinet 15 where it is reduced to fully hardened condition. The mix and cooling cabinets remain on the system, with the freezer excluded therefrom, until it is desired to freeze another batch of cream, at which time valve 41 is thrown to the "on" position to permit the freezing of a second batch of cream in the manner described.

The foregoing detailed description has been given for clearness of understanding only, and no unnecessary limitations should be understood therefrom, but the appended claims should be constructed as broadly as permissible in view of the prior art.

What I regard as new and desire to secure by Letters Patent is:

1. In an ice cream freezing system the combination of a freezer, including a cream chamber and a compartment associated therewith for receiving a refrigerating medium, an ice cream hardening unit and a cooling element therefor, a compressor, a condenser associated with said compressor, connections for supplying liquid refrigerant from said condenser to the freezer and hardening units, vapor return lines for conducting vaporized refrigerant from said units to the compressor, and valve mechanism interposed in said return lines for simultaneously opening one of the returns and closing the other, thereby permitting isolation of either the freezer or the hardening unit from the system and rendering the entire capacity of the condenser available for the unit remaining in the system.

2. In an ice cream freezing system the combination of a freezer, including a cream chamber and a compartment associated therewith for receiving a refrigerating medium, an ice cream hardening unit and a cooling element therefor, a compressor, a condenser associated with said compressor, connections for supplying liquid refrigerant from said condenser to the freezer and hardening units, a vapor return line for conducting vaporized refrigerant from the freezer to the condenser, a second vapor return line for conducting vaporized refrigerant from the hardening unit to the return line for the freezer, and a two-way valve positioned in the vapor return for the freezer at its point of connection with the return for said hardening unit for simultaneously opening one of said returns and closing the other, thereby permitting isolation of either the freezer or the hardening unit from the system and rendering the entire capacity of the condenser available for the unit remaining in the system.

3. In a refrigerating system for ice cream freezers, the combination with a freezer provided with a compartment for receiving a refrigerating medium, of a compressor, a condenser associated with said compressor, connections for conducting liquid refrigerant from said condenser to the cooling compartment of the freezer and for returning vaporized refrigerant from said compartment to the compressor, a hardening unit, including a cooling element having connections for receiving liquid refrigerant from the condenser and for returning vaporized refrigerant to the vapor return line for the freezer, and valve means interposed in the vapor return for the freezer at its point of connection with the return for said hardening unit for simultaneously opening one of said returns and closing the other, thereby permitting isolation of either the freezer or the hardening unit from the system and rendering the entire capacity of the condenser available for the unit remaining in the system.

4. In a refrigerating system for ice cream freezers, the combination with a freezer provided with a compartment for receiving a refrigerating medium, of a compressor, a condenser associated with said compressor, connections for conducting liquid refrigerant from the condenser to the cooling compartment of the freezer and for returning vaporized refrigerant from said compartment to the compressor, a mix cooling cabinet, a hardening cabinet, cooling elements in said cabinets having connections for receiving liquid refrigerant from the condenser and for returning vaporized refrigerant to a common return line connecting with the return line for the freezer, and valve means positioned in the vapor return for the freezer at its point of connection with said common return for the mix and hardening cabinets for simultaneously opening one of said returns and closing the other, thereby permitting isolation of either the freezer or the mix and hardening cabinets from the system and rendering the entire capacity of the condenser available for the unit or units remaining in the system.

5. In an ice cream freezing system the combination of a freezer, including a cream chamber and a compartment associated therewith for receiving a refrigerating medium, an ice cream hardening cabinet and a cooling element therefor, a compressor, a condenser associated with said compressor, a supply line including a thermostatic expansion valve for conducting liquid refrigerant from the condenser to the freezer, a second supply line including a thermostatic expansion valve for conducting liquid refrigerant from the condenser to the hardening cabinet, vapor return lines for conducting vaporized refrigerant from said hardening cabinet and the freezer to the compressor, and valve mechanism interposed in said return lines for simultaneously opening one of the returns and closing the other, thereby enabling either the freezer or the hardening cabinet to be excluded from the system and rendering the full capacity of the condenser available for the unit remaining in the system.

6. In an ice cream freezing system the combination of a freezer, including a cream chamber, and a compartment associated therewith for receiving a refrigerating medium, an ice cream hardening cabinet and a cooling element therefor, a compressor, a condenser associated with said compressor, a supply line including a thermostatic expansion valve for conducting liquid refrigerant from the condenser to the freezer, a second supply line including a thermostatic expansion valve for conducting liquid refrigerant from the condenser to the hardening cabinet, a vapor return line for conducting vaporized refrigerant from the freezer to the condenser, a second vapor return line for conducting vaporized refrigerant from the hardening cabinet to the return line for the freezer, and a two-way valve positioned in said vapor return for the freezer at its point of connection with said return for the hardening cabinet for simultaneously opening one of said returns and closing the other, thereby enabling either the freezer or the hardening cabinet to be excluded from the system and rendering the full capacity of the condenser available for the unit remaining in the system.

JAMES T. SMITH.